United States Patent [19]

Hirose et al.

[11] Patent Number: 4,699,229
[45] Date of Patent: Oct. 13, 1987

[54] ENDLESS ARTICULATED STEEL BAND VEHICLE FOR OFF-ROAD SERVICES

[75] Inventors: Takeo Hirose, Hamana; Shinobu Tsutsumikoshi; Tomomi Machii, both of Hamamatsu, all of Japan

[73] Assignee: Suzuki Motor Company Limited, Japan

[21] Appl. No.: 794,669

[22] Filed: Nov. 4, 1985

[30] Foreign Application Priority Data

Mar. 20, 1985 [JP] Japan .................................. 60-56662
Mar. 29, 1985 [JP] Japan .................................. 60-66062
Mar. 30, 1985 [JP] Japan .................................. 60-67639

[51] Int. Cl.$^4$ ...................... B62D 55/02; B62D 55/06
[52] U.S. Cl. .................... 180/9.21; 180/9.25; 180/9.58; 180/9.64; 180/183; 305/24; 305/27
[58] Field of Search ................... 180/9, 9.1, 9.21, 9.25, 180/9.23, 9.26, 9.28, 9.5, 9.54, 9.58, 183, 184, 185, 187, 190, 192, 193; 305/46, 24, 27, 35 R, 35 EB

[56] References Cited

U.S. PATENT DOCUMENTS

| | | | |
|---|---|---|---|
| 3,077,238 | 2/1963 | Nelson | 180/9.5 |
| 3,318,407 | 5/1967 | Deardorff | 180/9.25 |
| 3,336,994 | 8/1967 | Pederson | 180/9.25 |
| 3,545,559 | 12/1970 | Jones | 180/185 |
| 3,739,867 | 6/1973 | Drawe | 180/193 |
| 3,756,667 | 9/1973 | Bombardier | 180/193 |
| 3,934,944 | 1/1976 | Forsgren | 180/9.1 |
| 4,442,913 | 4/1984 | Grinde | 180/190 |
| 4,502,560 | 3/1985 | Hisatomi | 180/9.54 |
| 4,591,173 | 5/1986 | Marier | 180/190 |
| 4,613,006 | 9/1986 | Moss et al. | 180/9.25 |

FOREIGN PATENT DOCUMENTS

| | | | |
|---|---|---|---|
| 923948 | 4/1973 | Canada | 180/9.1 |
| 972783 | 8/1975 | Canada | 180/193 |

Primary Examiner—John J. Love
Assistant Examiner—Everett G. Diederiks, Jr.
Attorney, Agent, or Firm—McGlew and Tuttle

[57] ABSTRACT

An off-road vehicle is equipped with an endless articulated steel band drive system including a drive wheel, a plurality of idle wheels and an endless belt extending around the drive wheel and the idle wheel. A back slider plate extends along the inner surface of the endless belt to urge the ground contact surface of the endless belt against the ground. The leading portion of the back plate rises upwardly at an angle of with respect to the ground. One of the idle wheels is rotatably mounted to the rear end of the back plate and the back plate is mounted to the vehicle frame by a leaf spring.

3 Claims, 12 Drawing Figures

ENDLESS ARTICULATED STEEL BAND VEHICLE FOR OFF-ROAD SERVICES

BACKGROUND OF THE INVENTION (i) Field of the Invention

The present invention relates to an improvement in or relating to an off-road vehicle equipped with endless articulated steel band, and more particularly to an improved endless articulated steel band vehicle for off-road services which is equipped with an endless articulated steel band and is specifically adaptable to the running operations on the wilds and muddy grounds.

(ii) Description of the Prior Art

It is generally known that there has been developed saddle-type four-wheeled vehicles adaptable for the operations on the muddy grounds, roughs and wilds, which are designed with a similar basic frame construction to that of a two-wheeled vehicle or motor cycle.

Among such vehicles for the off-road services, there are known developed some ones which are equipped with the rear balloon tires having endless articulated steel band mounted around the circumference thereof for the operations on the sandy grounds or for the services on the snowy wilds in the winter season. Also, there are some others with four rear wheels having a endless belt extending across the two rear wheels on the each side of a vehicle.

Figure 12:
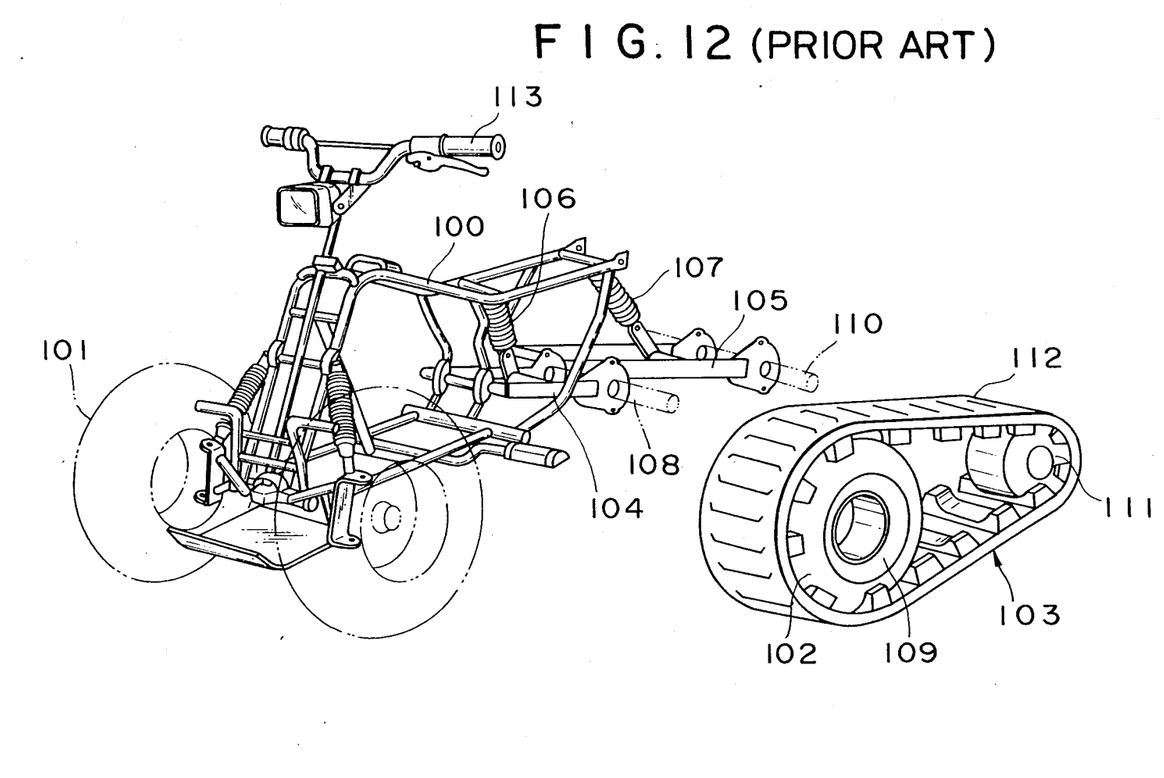
FIG. 12 is a perspective view showing the general construction of a typical off-road vehicle employing a conventional articulated steel band drive design.

FIG. 12 shows in general perspective view an off-road service vehicle having an endless articulated steel band drive equipped in the rear part of the main frame structure, which has been proposed in the prior application filed by the instant inventors.

According to this particular construction, the off-road vehicle is seen comprising a main frame complete of saddle-riding type as designated at the reference numeral 100, to which main frame there are provided two front wheels as designated at 101 and two rear wheels at 102, each of these rear wheel having an endless articulated steel band drive 103 mounted operatively thereon. More specifically, it is seen from the Figure that the endless articulated steel band drive 103 comprises two swing arms 104, 105 mounted swingably at the lower pivot axis of the main frame 100, a suspension units 106, 107 for suspending these swing arms from the main frame 100, a rear wheel 109 mounted rotatably by the swing arm 104 through a drive shaft 108 extending outwardly, an idle wheel 111 held rotatably by the swing arm through an idle shaft 110, and an endless belt 112 mounted extending across the rear wheel 109 and the idle wheel 111.

With this construction, this vehicle is well adaptable to the running operations following the irregular ground surfaces of the roughs and wilds, with the equipment of this rubber endless belt 112 mounted operatively across the rear wheel 109 and the idle wheel 111.

Incidentally, this vehicle is equipped with a steering handle of bar type designated at 113, which is adapted to the steering operation of the front wheels 101.

Now, referring to the conventional off-road service vehicles having the articulated steel band drive of such a construction as noted above, while the articulated steel band drive of this type may be afforded with a relatively simple construction making use of the existing rear drive axis and wheel mechanism, it was then inevitable that this construction may make longer the overall length of a vehicle, thus resulting in an undesirably substantial vehicle extension, because of the employment of an idle wheel 111 having a similar dimension which has to be mounted in a further rear position of the rear wheel 109.

Besides, in the general construction of such an off-road vehicle of articulated steel band drive type, there are some that have no differential gears equipped in the power train of the drive shaft 108 for the rear wheel 109 in an attempt to cut the production cost short, in which case their turning characteristics turned naturally to be sacrificed.

In addition, according to the conventional construction of a vehicle having the rear articulated steel band drive, when it is put to run on the soft and unstable grounds like in a fresh coat of snow or in sands, the vehicle cannot possibly get out of captures at its gears and move any further because of its shortage in the lift effect of such drive.

Furthermore, with the vehicle having the articulated steel band drive of such conventional construction, there may possibly occur a substantial looseness in the articulated steel band drive due to the irregularities and roughness in the ground surface, thus affecting the adhesion effect of the drive like a slippage or a loss of drive.

In view of such drawbacks as encountered in the conventional construction of the off-road vehicle of articulated steel band drive type, the present invention is essentially directed to the provision of an improved construction of a rear articulated steel band drive mechanism for use in a vehicle of saddle riding type for the irregular ground services.

SUMMARY OF THE INVENTION

It is therefore a primary object of the present invention to provide an improved saddle-riding type vehicle for use on the irregular ground equipped with an endless articulated steel band drive, which can afford an improved turning characteristic, with a compact construction of articulated steel band drive, while maintaining a reasonable low production cost.

It is another object of the present invention to provide an improved saddle-riding type vehicle for use on the irregular ground equipped with an endless articulated steel band drive, which can efficiently serve on a soft and unstable ground condition like in a fresh coat of snow or the like as a snow mobile or equivalent operating means.

It is a further object of the present invention to provide an improved saddle-riding type vehicle for use on the irregular ground equipped with an endless articulated steel band drive, which can afford the prevention of looseness or slackness in an endless belt during the operation, thus contributing substantially to the improvement in the manoeuvreability of a vehicle.

According to the invention, there is attained an improved off-road vehicle equipped with an endless articulated steel band drive of the type including an endless belt extending across a drive wheel and an idle wheel, which comprises, as summarized in brief, one of the drive wheel and the plurality of idle wheels being disposed projecting outwardly facing the ground surface than any of the drive wheel and idle wheel, and wherein the endless belt extend around the all drive and idle wheels defining a polygonal path of endless articulated steel band drive system.

The above objects can also be attained from the improvement according to the invention, which comprises, as summarized in brief, back plate means extending along the inner sider of the ground contact surface of the endless belt means adapted to urge the ground contact surface of the endless belt means against the ground surface, having the leading portion thereof disposed raising upwardly at an angle of grade of $\theta$ with respect to the ground level.

The above objects can further be attained from the improvement according to the invention, which comprises, as summarized in brief, slider means disposed on the inner side of the ground contact surface of the endless belt means, resilient means supported operatively by main frame means of the vehicle and adapted to convert a vertical component of displacement of the endless articulated steel band drive system to a longitudinal component of displacement thereof, and having one end secured to the slider means and the other end mounted slidably on the slider means, and wherein the idle wheel means are supported operatively by the slider means.

Additional features and advantages of the invention will now become more apparent to those skilled in the art upon consideration of the following detailed description of a preferred embodiment exemplifying the best mode of carrying out the invention as presently perceived. The detailed description refers particularly to the accompanying drawings, in which like parts are designated at like reference numerals.

BRIEF DESCRIPTION OF THE DRAWING

In the drawings;

FIGS. 9 and 10 are fragmentary views showing the details of an adjusting device shown in FIG. 7, in which

DETAILED DESCRIPTION OF A PREFERRED EMBODIMENT

The present invention relating to a saddle-type off-road vehicle which adopts an endless articulated steel band drive system will now be explained in detail by way of a preferred embodiment thereof in conjunction with accompanying drawings.

Figure 1:
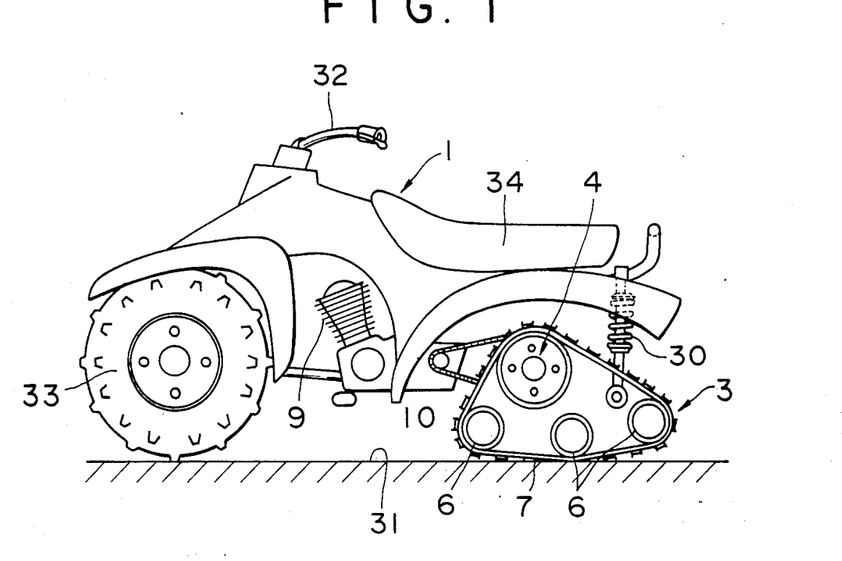
FIG. 1 is a general side elevational view showing by way of a preferred embodiment an improved saddle type vehicle for the irregular ground services according to the present invention.
Figure 2:
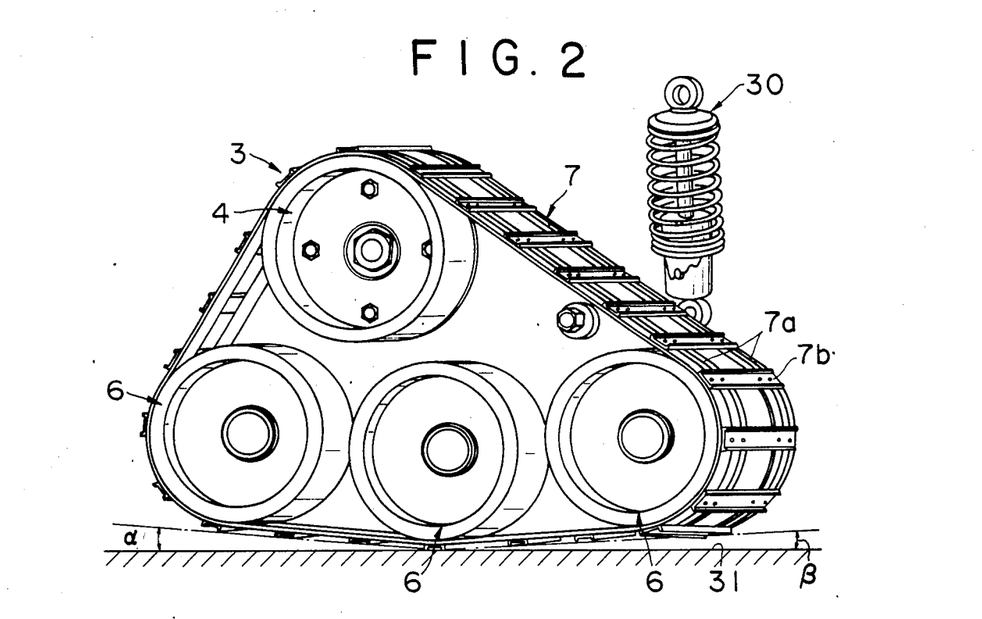
FIG. 2 is a fragmentary perspective view showing in enlargement the general construction of an endless articulated steel band drive according to the present invention.
Figure 3:
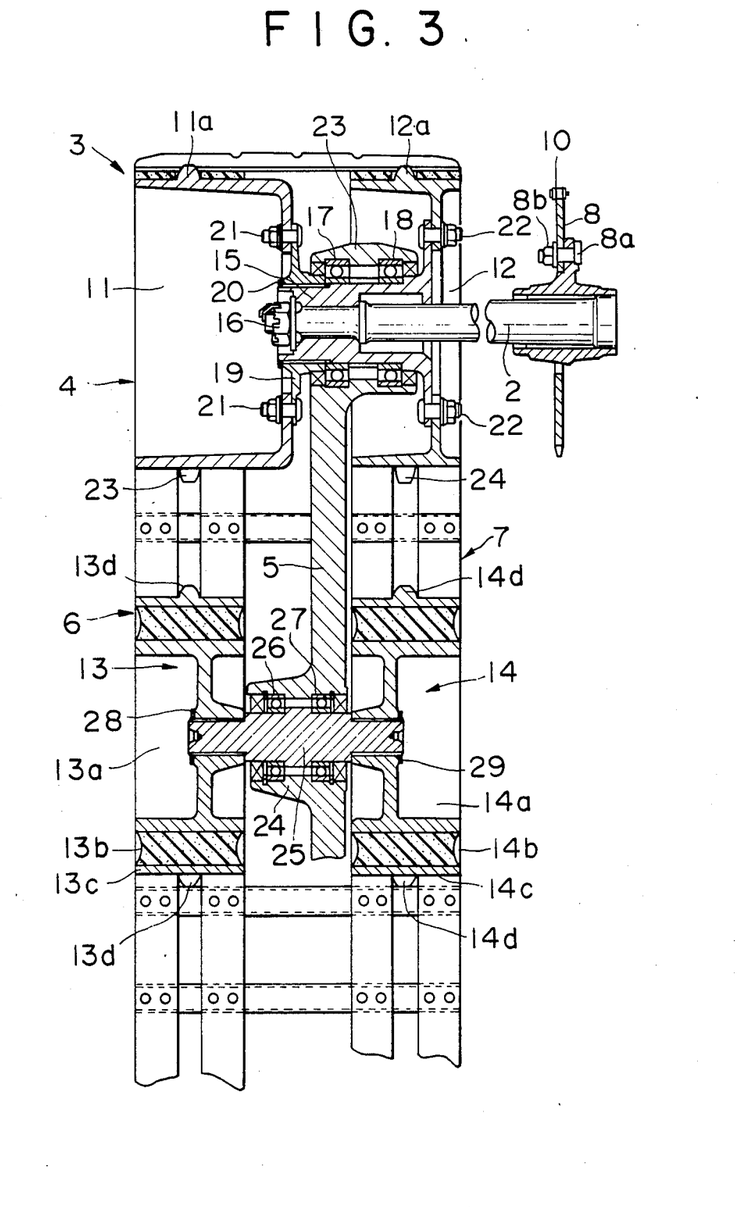
FIG. 3 is a fragmentary cross-sectional view showing partly in enlargement the details of the endless articulated steel band drive shown in FIG. 2.

Referring firstly to FIGS. 1 through 3, there is shown a substantial improvement by way of a first embodiment of the invention. In the following description, reference is made to the left side articulated steel band drive unit alone omitting the opposite side unit, since there are a pair of articulated steel band drive units of similar construction disposed in symmetrical relationship with each another on either side of the vehicle.

An off-road vehicle of endless articulated steel band drive type 1 according to the first embodiment of the invention is of a construction such that there is provided an endless articulated steel band drive unit 3 on a drive shaft 2 shown in FIG. 2, on which a rear wheel (not shown) is generally mounted when adapted as a four-wheeled version.

This endless articulated steel band drive unit 3 of the invention comprises a drive wheel 4 mounted operatively on the drive shaft 2, three idle wheels 6 mounted in generally serial fashion for free rotation on a rigid wheel frame 5 and connected operatively to the drive wheel 4, and an endless belt assembly 7 extending across the drive wheel 4 and these idle wheels 6. The description will now follow in detail on the constructions of these members.

As shown in FIG. 3, on the drive shaft 2, there is mounted securely a sprocket wheel 8 by using bolts 8a and nuts 8b, through which the power from an engine 9 is transmitted to the drive shaft 2 through a drive chain 10 and the sprocket wheel 8.

There is employed no differential gears (not shown) on the drive shaft 2. The drive wheel 4 is seen comprising sprocket wheels 11, 12 and the idle wheel 6 comprising idle sprockets 13, 14, respectively. There is also secured an inner hub member 15 on the drive shaft 2 by way of engagement means as splines or the like provided at both ends of the shaft 2, and further by a lock nut 16 or the like to be screwed-in from the outside, so that the shaft 2 may be held in position from playing in the axial direction.

There are also disposed bearings 17, 18 and an outer hub member 19 on the outer circumference of the inner hub member 15 in such a manner that these members may be held in position from playing in the axial direction by using a circlip or snap ring 20. The outer hub member 19 is mounted securely on the inner hub member 15 by way of splines.

The sprocket wheel 11 is seen held in position on the circumference of the outer hub member 19 by using a plurality of bolts 21, while the sprocket wheel 12 is likewise secured on the circumference of the inner hub member 15 by using a plurality of securing bolts 22.

There are provided a plurality of engaging teeth 11a and 12a on the outer circumferential surfaces of the sprocket wheels 11 and 12, respectively.

The wheel frame 5 is provided with a bearing box 23 and other three bearing boxes 24. There is mounted rotatably the drive shaft 2 together with the inner hub member 15 centrally in the bearing box 23 through the bearings 17, 18, and also there are mounted rotatably idle shafts 25 of the idle wheels 6 in the bearing boxes 24 through bearings 26, 27, respectively.

On the opposite ends of the idle shaft 25, there are held securely idle sprocket wheels 13, 14 from their axial play motions by way of circlips or snap rings 28, 29, respectively.

These idle sprocket wheels 13, 14 are seen comprising an inner wheel portion 13a, 14a, a cushioning portion 13b, 14b and an outer wheel portion 13c 14c, respectively.

The cushioning portions 13b, 14b are formed from a resilient material such as a rubber, which is sandwiched between the inner wheel portion 13a, 14a and the outer wheel portion 13c, 14c in such a manner that the inner wheel portion 13a, 14a and the outer wheel portion 13c, 14c may be connected resiliently with each other, respectively. There are also provided a plurality of engaging teeth 13d, 14d on the outer circumferential surfaces of the outer wheel portion 13, 14c, respectively.

As generally seen in FIG. 2, it is specifically designed that these idle wheels 6 are disposed at a lower position than the drive wheel 4, and that the central idle wheel 6 is disposed further lower than the remaining idle wheels 6.

On the other hand, there is provided an endless belt assembly 7 which comprises a pair of endless resilient belt elements 7a running in parallel with each other and a plurality of cross-friction elements 7b disposed extending across the pair of belt elements 7a and in parallel relationship with each other.

More specifically, the endless articulated steel band drive unit 3 is constructed in such a manner that there is mounted the pair of endless resilient belt elements 7a extending around the drive wheel 4 and the three idle wheels 6 so as to have the engaging teeth 11a, 12a, 13d, 14d thereof engaged respectively with the gaps defined between the paired belt elements 7a of the endless belt assembly 7.

In this articulated steel band drive system, there is also provided a cushioning or shock absorber assembly 30 between a point of the wheel (not shown) frame and the main frame of the vehicle.

With such construction of the endless articulated steel band drive system according to the invention, there is attained a specific advantage that the endless belt assembly 7 may generally define an irregular quadrilateral shape when mounted extending around the drive wheel 4 and all the three idle wheels 6, with the central idle wheel 6 projecting slightly downwardly out of the remaining two idle wheels 6 so that the part of the endless belt assembly 7 engaing with this central idle wheel 6 may generally contact or engage the ground surface 31.

With this arrangement, it is seen from FIG. 2 that the endless belt assembly 7 define appropriate angles α and β before and after the central idle wheel 6 with respect to the ground surface 31 when placed in contact therewith.

It may be recalled that there is also provided another endless articulated steel band drive unit 3 on the right side of the vehicle, which is identical in construction yet disposed in symmetrical relationship with the left side unit, as referred to hereinbefore.

Further to FIG. 1, there are shown provided a bar handle designated at 32, a pair of steering front wheels at 33 and a driver's seat or saddle at 34.

By such an advantageous feature in construction of the articulated steel band drive system for an endless articulated steel band vehicle 1 for irregular ground services, it is to be noted that the vehicle may enjoy an excellent turning characteristic by virtue of the specific arrangement that the endless belt assembly 7 contacts generally in line upon the ground surface 31, in contrast to the conventional arrangement of surface contact type.

Also, with this improved off-road vehicle 1, by virtue of the employment of an endless articulated steel band drive unit 3 which is constructed as a unit, it is readily mountable onto the rear wheel drive shaft 2 of the vehicle, and thus making the vehicle shorter in the rear extension, accordingly.

While the description on this preferred embodiment is exclusively directed to the employment of three idle wheels 6, it is naturally possible that more than three wheels are to be adopted.

In this case, it is of course preferred that there is defined a polygonal shape in the arrangement of such idle wheels having the number of sides equivalent to that of the idle wheels plus the drive wheel. More specifically, it is the only requirement of the invention that there is provided a general line contact in the engagement of the articulated steel band drive of the vehicle with the ground surface by the provision of at least one idle wheel or the drive wheel disposed projecting outwardly out of the series of idle wheels upon the ground surface, accordingly.

Figure 4:
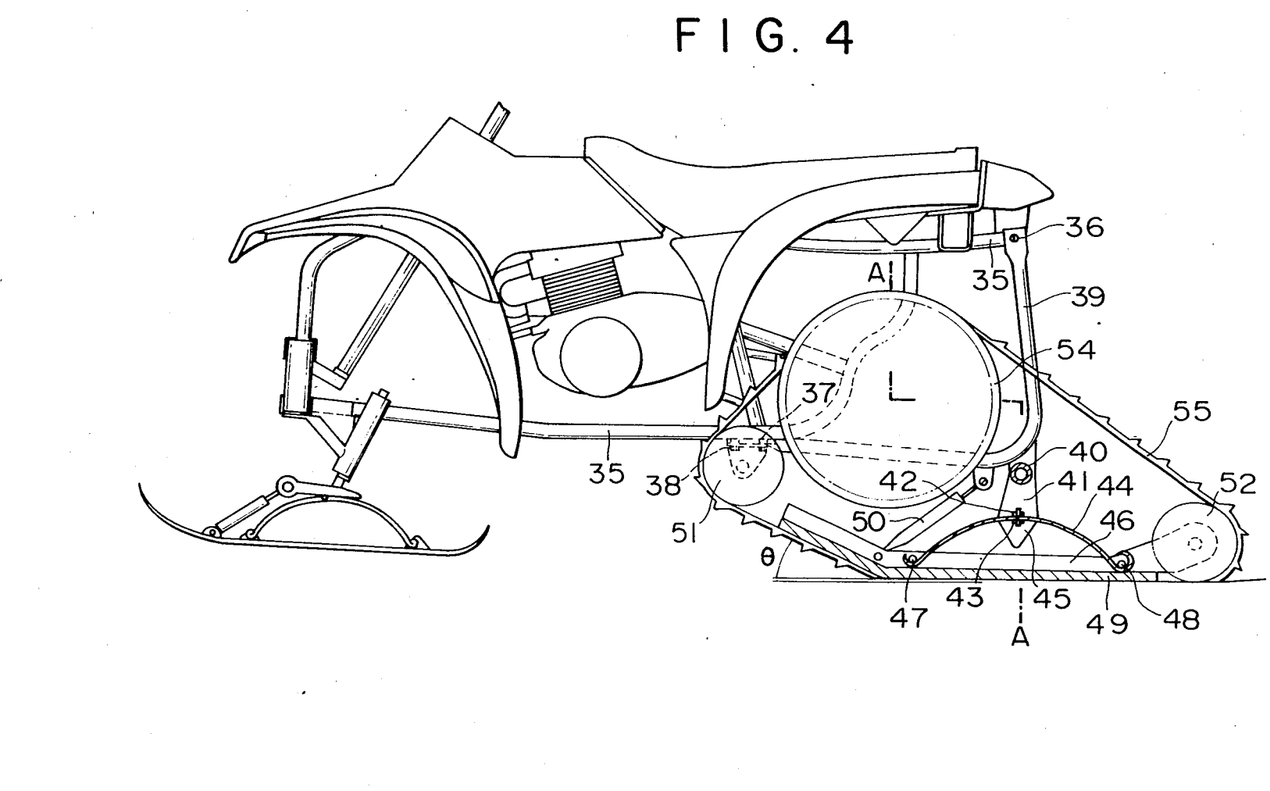
FIG. 4 is a side elevational view showing the general concept of another embodiment of an improved articulated steel band type off-road vehicle according to the invention.

Next, referring to FIG. 4, there is shown another embodiment of the invention, in which the front wheels of an off-road vehicle are replaced with a pair of skids, having the rear wheels replaced with a pair of endless articulated steel band drive units.

Also, there is provided a subframe 39 which is removably installed onto the rear part of the main frame 35 of the vehicle by using fixing bolts 36, 37, the subframe 39 having a rigid shaft 40 fixed thereon and having a pending plate 41 mounted rotatably from the rigid shaft 40. There is further mounted a leaf spring 44 at a lower point of the pending plate 41 by using a bolt 42 and a nut 43, and having a rubber stopper 45 at the free end thereof.

This leaf spring 44 is fixed securely at its center onto the plate 41, having the opposite extensions jointed in position to a back plate 46 of a bottom rail 49 by way of engaging pin 47, 48.

Figure 5:
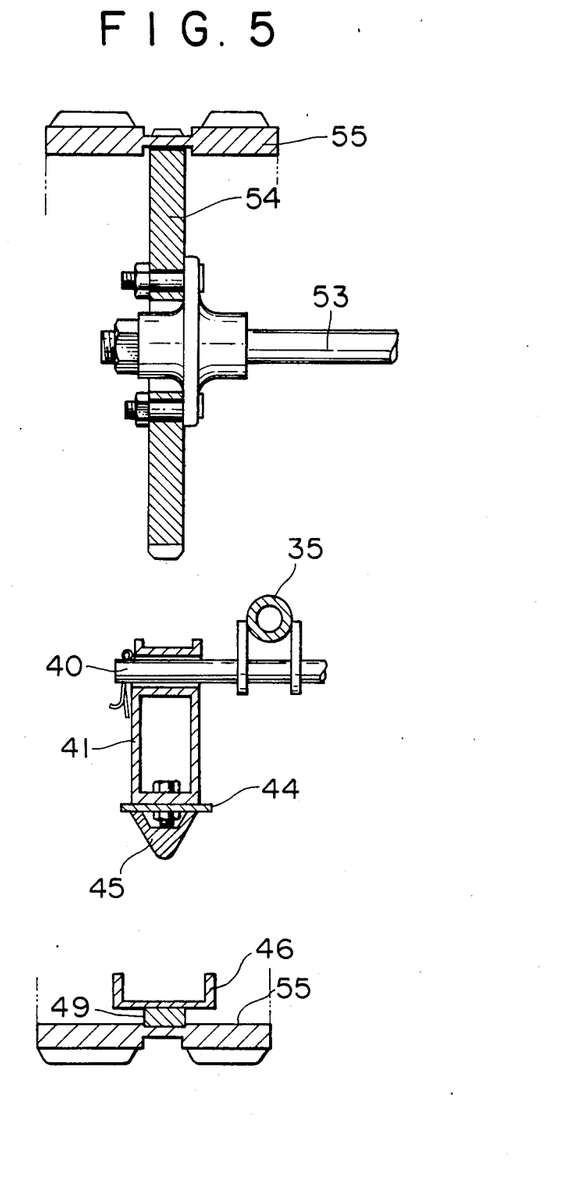
FIG. 5 is a cross-sectional view taken along the line A—A in FIG. 4.

The back plate 46 is, as shown in detail in FIG. 5, formed in a generally C-shape in cross section, under which there is mounted a bottom rail 49 for guiding the endless belt, and the back plate 46 works to back-up the shape of engagement of the bottom rail 49.

The back plate 46 is mounted movable both in the longitudinal and vertical directions by the effects of rotating motion of the plate 41 and of resiliency of the leaf spring 44.

As the leaf spring 44 and back plate 46 are connected rotatably at the engaging pin 48, yet slidably at the engaging pin 47, there is attained an efficient effect of absorbing an elastic deformation. The upper limit of this elastic deformation of the leaf spring 44 may be given by the rubber stopper 45. It is appreciated that the motions of the bottom rail 49 and the back plate 46 to be given from the rotating effort of the pending plate 41 may be restricted by a damper 50 disposed between the back plate 46 and the subframe 39.

There are mounted rotatably a first free wheel assembly 51 at the leading end of the subframe 39, and second free wheel assembly 52 at the trailing end of the back plate 46, respectively.

In addition, there is seen provided a sprocket wheel 54 of a substantial diameter secured upon the drive shaft 53 of a saddle-type vehicle at a higher point than the first and second free wheel assemblies 51, 52, as generally shown in FIG. 4.

It is constructed that an endless belt 55 driven from the sprocket wheel 54 may be guided along a drive path as defined by the first free wheel assembly 51, the rail 49, the second free wheel assembly 52 and the sprocket wheel 54, so as to drive the vehicle in the forward direction.

By virtue of such arrangement that the path of the endless belt 55 may be raised upwardly with respect to the ground as coated with snow or in other unstable condition at the leading area of the back plate 46 and the bottom rail 49, when the endless belt may go deeper into the ground, there will be produced a efficient effect of climbing at the raised extension of the endless belt, thus continuously pushing hard even in a deep fresh coat of snow or the like unstable condition of the ground.

In addition, the endless belt 55 may advantageously engage upon the ground surface followingly the irregularities and undulations thereof under the effect of rotating motion on the pending plate 41 and the resilient deformation of the leaf spring 44, there may be provided an efficient effect of adhesion and power transmission with an appropriate degree of tension rendered upon the endless belt.

Figure 6:
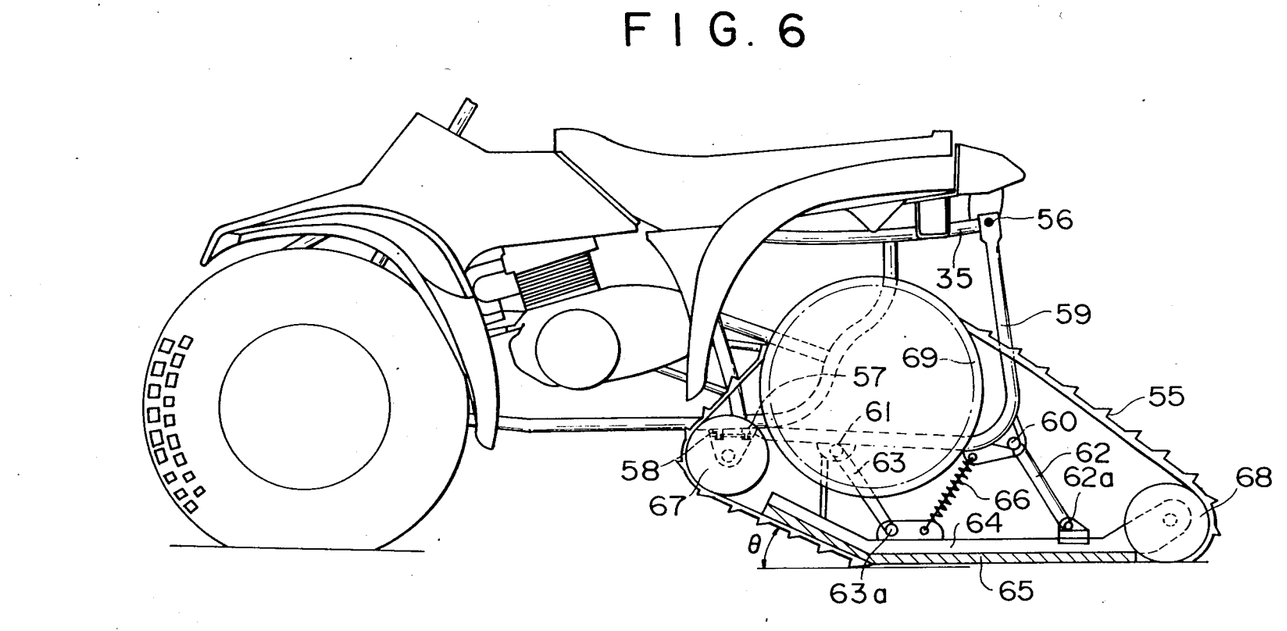
FIG. 6 is a general side elevational view showing the appearance of an improved off-road vehicle according to the invention by way of a still another embodiment thereof.

Now, referring to still another embodiment of the invention shown in FIG. 6, there is provided an improved off-road vehicle equipped with a pair of front wheels including balloon tires and with a different suspension mechanism from that shown in FIG. 4.

In this construction, it is seen that there is mounted removably a subframe 59 in the rear portion of a main frame 35 of the vehicle by using bolts 56, 57 and 58, the subframe 59 having rigid shafts 60, 61 mounted securely at the lower portions thereof, to which shafts there are connected the leading ends of support rods 62, 63 extending swingably in the longitudinal directions from mount structure of the articulated steel band drive. The opposite ends of these support rods 62, 63 are connected operatively to a back plate 64 and in such a fashion that there is defined generally a parallelogram by the subframe 59, the support rod 62, the back plate 64 and the support rod 63.

With this arrangement, it is advantageous that the back plate 64 may move substantially in parallel with respect to the ground surface. The back plate 64 is formed in a generally C-shape in cross-section, under which there is provided a guide rail 65 extending longitudinally for the endless belt.

It is notable that the general shape of guide rail 65 may be held by the rigidity of the back plate 64 for guiding the endless belt in the lower surface thereof as viewed in FIG. 6.

The swinging motion of the back plate 64 may be limited by the urging force from a damper assembly 66 connected rotatably from the back plate 64 and the subframe 59 in such a manner that it may extend defining an diagonal of the general parallelogram shape of the support mechanism noted above.

There is seen provided a first free wheel assembly 67 at the leading end of the subframe 59, and also there is mounted a second free wheel assembly 68 at the trailing end of the back plate 64.

It is noted that there is mounted a drive sprocket wheel 69 on the drive shaft of the saddle-riding type vehicle at a substantially higher position than the first free wheel assembly 67 and the second free wheel assembly 68, as typically shown in FIG. 6.

It is constructed that an endless belt 55 driven from the drive sprocket wheel 69 may be guided along a drive path as defined by the first free wheel assembly 67, the guide rail 65, the second free wheel assembly 68 and the drive sprocket wheel 69, so as to have the vehicle driven in tractive motion in the forward direction.

In this embodiment, as the back plate 64 and the bottom rail 65 are specifically designed at their leading portion to define an angle of grade $\theta$ with respect to the ground surface, even when the vehicle may be captured by and sink deeper into the unstable ground, there is produced an efficient effect of climbing upwardly as generated at the raised leading portion of the articulated steel band drive unit, together with the effect of close adhesion upon the ground surface of the endless belt as gnerated from the swinging motion of the back plate 64, thus resulting in an appropriate tension rendered upon the endless belt, accordingly.

Figure 7:
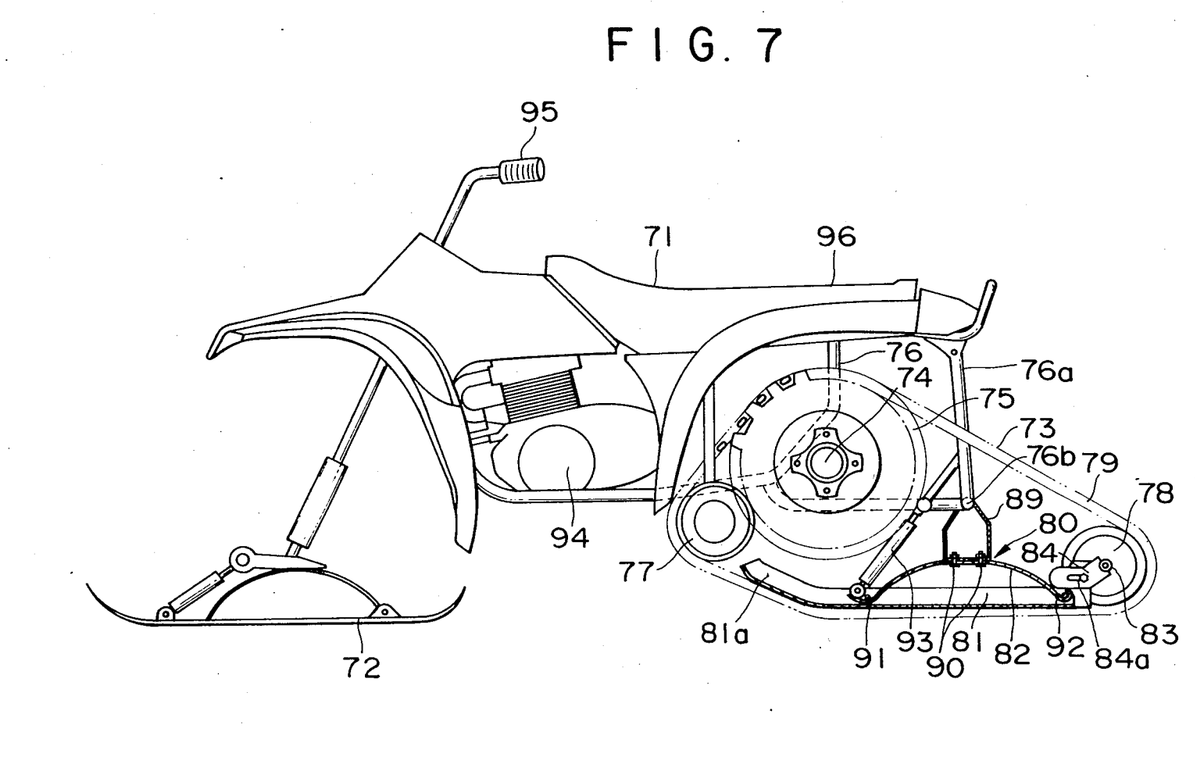
FIG. 7 is a similar side elevational view showing a further embodiment of the invention.

FIG. 7 shows in a general side elevational view a further embodiment of an off-road vehicle of the type equipped with a front pair of steering skids installed in place of normal steering front wheels and a rear articulated steel band drive system in place of rear drive wheels, in which there is specifically provided a means for preventing a slack in the endless belt of the vehicle.

In FIG. 7, there are shown a main frame 71 of the articulated steel band-driven vehicle for irregular ground services, a pair of front skids 72 mounted in place of the normal front wheels, and a pair of articulated steel band drive units 73 in place of the normal rear drive wheels of the vehicle.

Figure 8:
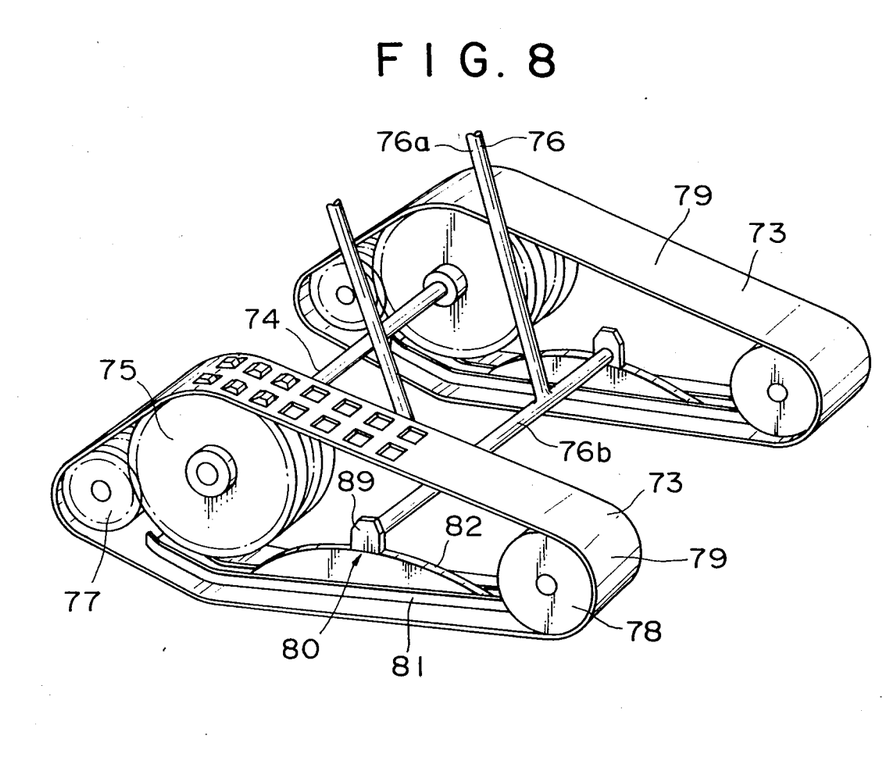
FIG. 8 is a perspective view showing the general construction of the endless articulated steel band drive shown in FIG. 7.

It is shown typically in FIG. 8 that this endless articulated steel band drive unit 73 comprises a driving sprocket wheel 75 mounted operatively on a rear drive axle 74, a stationary idle wheel 77 mounted freely rotatably in the front of the driving sprocket wheel 75 by a support frame 76, a movable idle wheel 78 disposed in the lower rear position of the driving sprocket wheel 75 and adapted to be shiftable in the longitudinal directions of the vehicle, an endless belt 79 extending around the driving sprocket wheel 75, the stationary and movable idle wheels 77, 78, and an adjusting means 80 adapted to adjust a tension rendered in the endless belt 79 by adjustably changing a longitudinal position of the movable idle wheel 78.

This adjusting means 80 is seen comprising an elongated slider element 81 disposed extending in the longitudinal direction and along the opposite side of the ground contact surface of the endless belt 79, a leaf spring 82 disposed operatively upon the slider element 81 in such a manner that it may work to resiliently displace the slider element 81 back and forth in accordance with a current quantity of longitudinal displacement of the entire articulated steel band drive system by converting a current quantity of vertical displacement as generated during the operation, which is equivalent in construction to the leaf spring of the embodiment shown in FIG. 4, and an extension arm 84 mounted extending rearwardly from the rear end of the slider element 81 and adapted to support a support sleeve 83 for the rotating shaft of the movable idle wheel 78. This slider element 81 is substantially identical in general shape with the back plate 64 shown in FIG. 4, and specifically designed to be displaceable relatively toward and away from the movable idle wheel 78.

Figure 9:
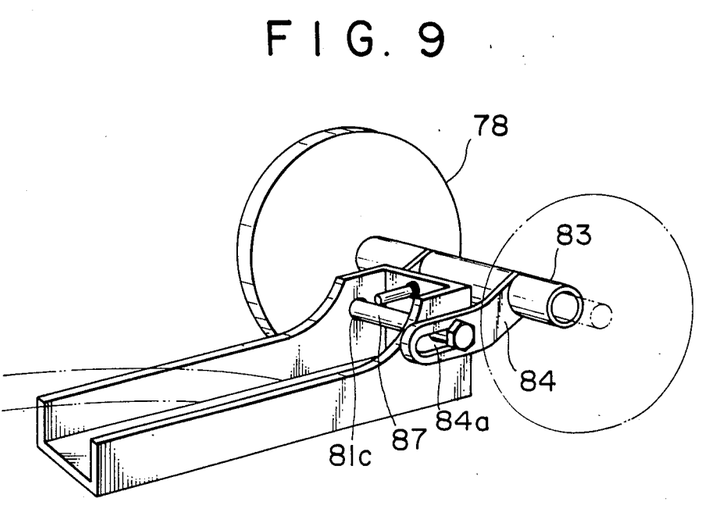
FIG. 9 is a perspective view showing the specific part of a movable idle wheel.

It is seen from FIG. 9 that the slider element 81 is formed to be generally U-shape in cross-section, having its leading end portion 81a raised upwardly at a certain angle with respect to the ground surface and having its trailing end portion with a higher side wall closed at its outer end with an end wall 81b. There is defined an opening not shown in this end wall 81b, in which there is inserted an adjusting screw 85 for adjusting the longitudinal position of the support shaft 83 of the movable idle wheel 78, and locked securely in position with a nut 86.

The extension arm 84 for supporting the movable idle wheel 78 is defined with an elongated opening 84a extending longitudinally, and also the rear side wall portion of the slider 81 is defined with an opening 81c. This extension arm 84 may therefore be fixed adjustably in the longitudinal directions upon the slider element by using a bolt 87 extending through the elongated opening 84a and the opening 81c and a nut not shown. On the other hand, there is provided a layer of plastic resin 88 projecting longitudinally along the backside of the slider element 81, which plastic layer may be placed snugly into the recess defined longitudinally in the center of inner surface of the endless belt 79.

Figure 10:
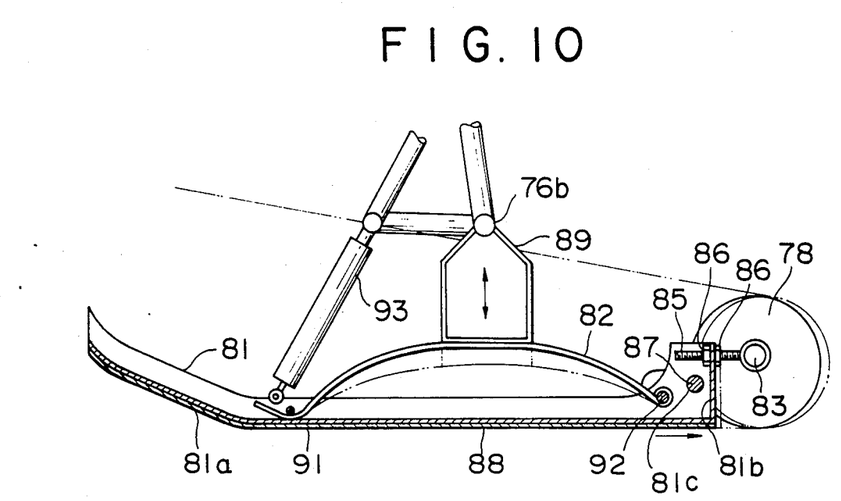
FIG. 10 is a schematic view showing a resilient means adopted in the embodiment shown in FIG. 7.

The leaf spring 82 is shaped with an upward curvature, and adapted to be held rotatably from an extension frame 76b pending downwardly from the main frame 76 of the vehicle by way of a mount plate 89 which is mounted pending rotatably from the lower end of the extension frame 76b, and to which the leaf spring 82 is secured rigidly by using bolts 90.

More specifically, it is to be noted that the leaf spring 82 has its leading end free and its rear end fixed rigidly upon the side wall of the slider element 81 in such a manner that a vertical displacement of the entire endless belt 79 with respect to the leaf spring 82 may be converted into a longitudinal displacement so as to allow the entire slider element 81 to play or shift back and forth accordingly. This leaf spring 82 is held at its leading end bent upwardly so as to be caught in position yet allowing a longitudinal sliding play by way of a pin 91 mounted on the side surface of the slider element 81 and is secured at its trailing end to the rear end of the slider element 81 by way of a similar pin 92.

Further to FIG. 7, there is also shown a fluid damper assembly or shock absorber 93 having its one end held at a point of the main frame 76 and its other end held at a slot provided in the slider element 81, which is adapted to resiliently absorb a possible shock load as rendered from the front upon the endless belt 79 during the operation of the vehicle.

In addition shown in the Figure are an engine complete 94 mounted in the middle of the main frame 76, a bar handle 95 of the vehicle, and a driver's seat positioned upon the main frame 76.

Now the reference is made to the operation of the improved off-road vehicle of endless articulated steel band drive type having the advantageous construction according to the invention.

At the moment that the entire articulated steel band drive system or belt 79 of the vehicle is forced upwardly due to the irregularities and undulations in the ground surface while running on such a condition as a deep coat of snow or the like, the leaf spring 82 under downward urging force may cause the slider element 81 to work efficiently to prevent a deformation or deviation of the endless belt 79. Also, at the instance that the slider element 81 is pushed upwardly with certain sharp irregularities in the ground surface, thus resulting in a substantial quantity of slackness in the endless belt 79, the leaf spring 82 may efficiently displace in the vertical directions and extending longitudinally, while absorbing a certain degree of shock load from the front by the damper assembly 91. Since the leading end of the leaf spring 82 is left free and the trailing end thereof is fixed rigidly upon the slider element 81, the entire slider element 81 may be shifted rearwardly as the rearward motion of the trailing end, whereby the movable idle wheel 78 may be shifted rearwardly through the extension arm 84, thus absorbing a current quantity of slackness in the endless belt 79, accordingly.

By the way, an appropriate extent of tension rendered upon the endless belt 79 may be attained from a due adjustment of the relative positions of the extension arm 84 and the adjusting screw 85, thus eventually adjusting the location of the movable idle wheel 78 with respect to the slider element 81.

Figure 11:
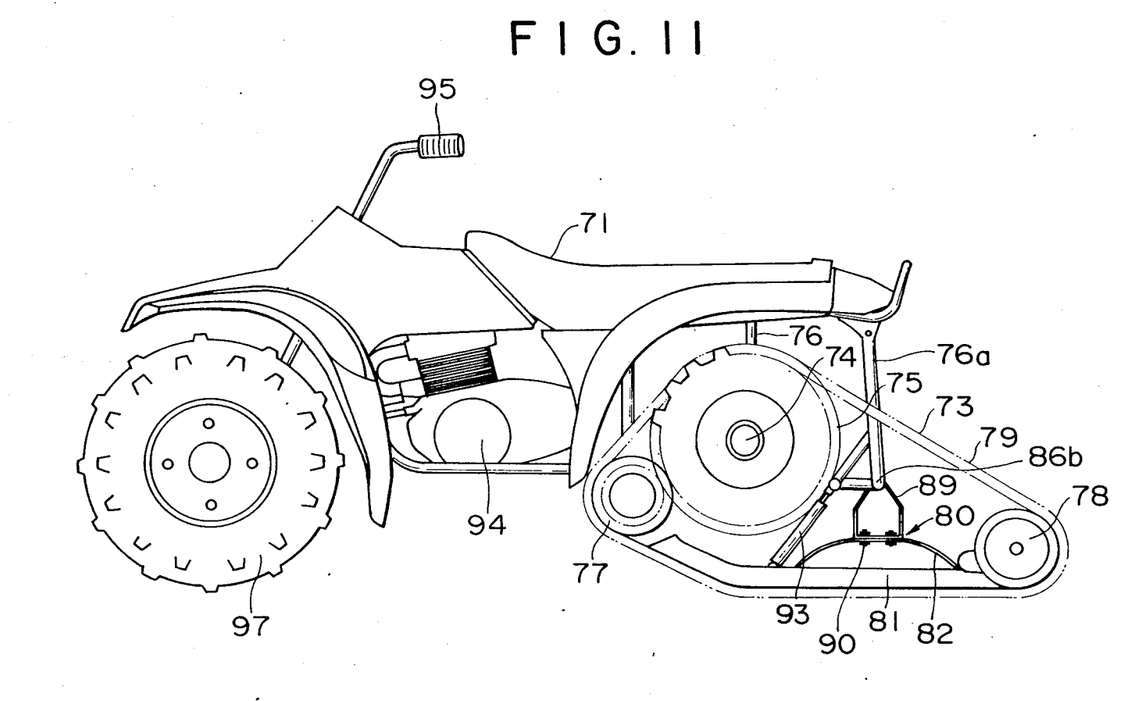
FIG. 11 is a side elevational view showing the combination, by way of a still further embodiment of the invention, of normal front wheels adopted in place of the skid shown in FIG. 7 with the rear articulated steel band drive.

On the other hand, for the operation on other irregular grounds than a coat of snow, it is needless to mention that the normal front wheels 97 may be employed in place of the front steering skid version.

As reviewed fully hereinbefore, the saddle-type off-road vehicle having the substantial improvement in its articulated steel band drive construction according to the present invention may present such advantageous effect as follows.

According to the employment of the improved articulated steel band drive system of the invention as reviewed hereinbefore, it is practicably possible to provide a relatively short rear extension of the vehicle by virtue of the compact articulated steel band drive system provided for replacing the normal rear drive wheels, in which one of the drive wheel and the plurality of idle wheels is disposed projecting out of the rest against the ground surface with the endless belt extending around all these wheels. In addition, by virtue of the line-contact endless belt with respect to the ground surface, the vehicle may enjoy an excellent turning characteristic without the employment of any differential gears in the rear drive system, thus maintaining a relatively low production cost.

By virtue of the ready-to-mount arrangement onto the rear drive shaft of the vehicle of the improved articulated steel band drive system according to the invention without the necessity of modification of a vehicle of conventional rear wheel drive type, the articulated steel band drive system may be manufactured with a less cost, which can afford the ready portability and extensive utility of the articulated steel band drive system which is adaptable in any situations, whenever and wherever necessary.

Also, as it is possible in practice to have the diameter of a drive wheel of the articulated steel band drive system as small as half in dimensions or even smaller than that of the rear wheels normaly·equipped, thus making it feasible to make a ratio of reduction gears substantially greater, and thus providing the vehicle with an extensive serviceability in a severer condition of operation.

In addition, by virtue of the advantage that there is attainable a powerful climbing capability when captured in an unstable condition of the ground such as a fresh and deep coat of snow, the vehicle may well serve as a snow mobile or other equivalent use.

Furthermore, by virtue of the employment of such improved arrangement that there are provided the endless belt extending around the drive wheel placed on the rear drive shaft and the series of idle wheels, the slider element disposed along the inner side of the ground contact surface of the endless belt, the resilient means mounted on the main frame of the vehicle and adapted to work converting a vertical component of displacement into a longitudinal component of displacement of the entire endless belt as generated during the operation, having one end of the resilient means jointed rigidly to the slider element and its other end rested slidably onto the slider element, and having the series of idle wheels held operatively on the slider element, there is attained the efficient means of preventing any slackness in the endless belt from occurring due to the irregularities in the ground surface such as in a deep coat of snow. Also, this advantageous arrangement may serve efficiently following accordingly the irregularities in the ground surface, with the resilient mount of the slider element served by the resilient means and with the constant flatness in the ground contact surface of the endless belt which is attributable to the slider element.

While the present invention has been described in detail by way of specific preferred embodiments thereof, it is to be understood that the present invention is not intended to be restricted to the details of such specific constructions shown in the preferred embodiments, but to contrary, the present invention can of course be practiced in many other ways to an equal advantageous effect in accordance with the foregoing teachings without any restriction thereto and without departing from the spirit and scope of the invention.

It is also to be understood that the appended claims are intended to cover all of such generic and specific features particular to the invention as disclosed herein and all statements relating to the scope of the invention, which as a matter of language might be said to fall thereunder.

What is claimed is:

1. A saddle-type off-road vehicle comprising, a frame, a drive system mounted to said frame and having a drive wheel, at least one idle wheel directly mounted for rotation to said frame, at least one additional idle wheel spaced from said drive wheel and from said first mentioned idle wheel, an endless articulated belt engaged around said idle wheels and said drive wheel for being driven by said drive wheel, said belt having an outer ground contacting surface and an inner surface, a plate-like slider engaged against said inner surface of said belt for urging said outer surface of said belt against the ground, said slider being positioned between said first mentioned idle wheel and said additional idle wheel, said additional idle wheel being mounted for rotation to a trailing end of said slider with respect to a direction of movement of the off-road vehicle, said first mentioned idle wheel being positioned forwardly and upwardly of said slider, said slider having a forward end inclined upwardly at an angle, said belt being engaged against said forward end of said slider and extending at said angle from said slider to said first mentioned idle wheel, a leaf spring having a rear end, a forward end and an upwardly curved middle portion, said upwardly curved middle portion being connected to said frame, said rear end of said leaf spring being fixed to said slider near the rear end of said slider, said slider having a pin spaced from the rear end of said slider, said forward end of said leaf spring being engaged under said pin for permitting relative sliding movement between said forward end of said leaf spring and said slider to absorb vertical shocks against said slider, and a shock absorber connected between said slider and said frame for dampening shocks applied to said slider before the shocks are transmitted to said frame.

2. A vehicle according to claim 1 including adjustment means connected between said additional idle wheel and said slider for adjusting the position of said additional idle wheel on said slider to tighten said belt.

3. A vehicle according to claim 2 wherein said drive wheel is between and above said first mentioned and additional idle wheels, said first mentioned idle wheel being higher than said additional idle wheel and said shock absorber being connected to said slider adjacent said pin.

* * * * *